United States Patent [19]

Sawada

[11] Patent Number: 5,047,839
[45] Date of Patent: Sep. 10, 1991

[54] IMAGE SQUEEZING CIRCUIT FOR SQUEEZING ORDINARY-SIZED IMAGE INTO SMALLER AREA

[75] Inventor: Akira Sawada, Tokyo, Japan

[73] Assignee: NEC Corporation, Japan

[21] Appl. No.: 429,142

[22] Filed: Oct. 30, 1989

[30] Foreign Application Priority Data

Oct. 31, 1988 [JP] Japan ................................. 63-276464

[51] Int. Cl.⁵ ........................ H04N 5/45; H04N 9/74; H04N 9/76
[52] U.S. Cl. ...................................... 358/22; 358/183
[58] Field of Search ....................... 358/22, 13, 36, 183

[56] References Cited

U.S. PATENT DOCUMENTS

| | | | |
|---|---|---|---|
| 4,063,280 | 12/1977 | Hattori | 358/22 |
| 4,134,128 | 1/1979 | Hurst | 358/22 |
| 4,204,227 | 5/1980 | Gurley | 358/22 |
| 4,220,965 | 9/1980 | Heitmann | 358/22 |
| 4,291,331 | 9/1981 | Devereux | 358/13 |
| 4,656,515 | 4/1987 | Christopher | 358/22 |
| 4,712,130 | 12/1987 | Casey | 358/22 |

Primary Examiner—John W. Shepperd
Attorney, Agent, or Firm—Ostrolenk, Faber, Gerb & Soffen

[57] ABSTRACT

An image squeezing circuit produces an output image carrying signal for reproducing a small-sized image 1/m times larger than an ordinary-sized image (where m is an integer not less than two), and an input image carrying signal is separated for producing an analog chrominance subcarrier signal, an analog luminance signal and a color subcarrier signal, wherein the analog luminance signal is sampled with a sampling signal n/m times larger in frequency than the color subcarrier signal (where n is an integer not less than three) for producing a decimated digital luminance signal but the analog chrominance subcarrier signal is sampled with another sampling signal n times larger in frequency than the color subcarrier signal in every m pulse intervals of the color subcarrier signal for producing a decimated digital chrominance signal, the decimated digital luminance signal and the decimated digital chrominance signal being supplied to respective digital-to-analog converting circuits in response to a high frequency pulse signal n times larger in frequency than the color subcarrier signal for producing the output image carrying signal.

7 Claims, 4 Drawing Sheets

IMAGE SQUEEZING CIRCUIT FOR SQUEEZING ORDINARY-SIZED IMAGE INTO SMALLER AREA

FIELD OF THE INVENTION

This invention relates to an image reproducing system such as, for example, a video tape recorder and, more particularly, to an image squeezing circuit for reproducing a small image or images overlapped with a large image on a display.

DESCRIPTION OF THE RELATED ART

There have been proposed various image reproducing systems such as video tape recorders, and an image reproducing system is provided with an image squeezing circuit so that an ordinary-sized image reproducible from one image signal is squeezed into a small-sized image for overlapping with another ordinary-sized image reproduced from another image signal on a display. The image reproducing system with the image squeezing circuit reproduces two different-sized images on the display, and the audience can enjoy two dramas concurrently proceeding on a single display. However, since a composite image signal carrying an image is produced through a quadrature two-phase modulation, the image squeezing can not be achieved simply through a decimating or thinning-out operation on the composite image signal. Two approaches are proposed for the image squeezing.

The first approach is described in "VIDEO TECHNICAL TOPICS", Television Technology 1986 July, pages 89 to 94, published by Electronic Technology Publishing Corporation According to the paper, a chrominance signal is demodulated for reproducing an original color signal, and the original color signal is decimated through a sampling operation with a relatively low sampling frequency. Then, the color signal is modulated into a chrominance signal again, and the chrominance signal thus decimated is used for reproducing a small-sized image.

The second approach is reported in "TOSHIBA DIGITAL Hi-Fi VIDEO A-900PCM", Television Technology 1987 January, pages 20 to 24. The second approach is characterized by changing a chrominance subcarrier signal in frequency. Namely, the chrominance subcarrier signal is decreased to a lower frequency than the ordinary frequency, and the reduction is equal to the proportion of the small-sized image to the ordinary-sized image. Finally, the reduced chrominance subcarrier signal is recovered to the ordinary frequency after a decimating operation. Of course, pieces of information indicative of the color phase are recovered after the decimating operation. For example, if the composite image signal is produced in accordance with the NTSC color system, the chrominance subcarrier signal is 3.58 MHz. When the small-sized image is assumed to be a half of the ordinary image, the chrominance subcarrier signal is decreased to 1.79 MHz.

The first approach is desirable for a television system, because the demodulated color signal is necessary so as to reproduce the image. However, if the first approach is applied to a video tape recorder system or an audio-visual amplifier system, the system requires a quadrature two-phase demodulator as well as a modulator. These circuits make the system arrangement complicated. Moreover, color mismatching tends to take place at the modulation and the demodulation.

On the other hand, the second approach encounters a difficulty in the preservation of the pieces of information indicative of the color phase, and, for this reason, the reduction ratio is inherently fixed to a single value. In other words, it is impossible to vary the reducing ratio.

SUMMARY OF THE INVENTION

It is therefore an important object of the present invention to provide an image squeezing circuit which is simple in circuit arrangement.

It is also an important object of the present invention to provide an image squeezing circuit with which it is relatively easy to vary the reducing ratio.

In accordance with the present invention, there is provided an image squeezing circuit operative to produce an output image carrying signal for reproducing a small-sized image on the basis of an input image carrying signal for being capable of reproducing an ordinary-sized image m times larger than the small-sized image, where m is an integer equal to or greater than two, comprising: (a) a separating section supplied with the input image carrying signal and operative to produce an analog luminance signal and an analog chrominance subcarrier signal; (b) a color subcarrier producing section supplied with the input image carrying signal and operative to produce a color subcarrier signal which is of a periodical signal; (c) a timing signal producing section operative to produce a first sampling clock signal an n times larger in frequency than the color subcarrier signal and appearing in every intervals of the color subcarrier signal where n is an integer equal to or greater than three, a second sampling signal n/m times larger in frequency than the color subcarrier signal and a high frequency periodical signal n times larger in frequency than the color subcarrier signal; (d) a first decimating section supplied with the analog chrominance subcarrier signal and responsive to the first sampling signal for producing a decimated digital chrominance signal, the decimated digital chrominance signal being delivered therefrom in response to the high frequency periodical signal; (e) a second decimating section supplied with the analog luminance signal and responsive to the second sampling signal for producing a decimated digital luminance signal, the decimated digital luminance signal being delivered therefrom in the presence of the high frequency periodical signal; and (f) an output section supplied with the decimated digital chrominance signal and the decimated digital luminance signal and operative to produce the output image carrying signal.

BRIEF DESCRIPTION OF THE DRAWINGS

The features and advantages of an image squeezing circuit according to the present invention will be more clearly understood from the following description taken in conjunction with the accompanying drawings in which.

DESCRIPTION OF THE PREFERRED EMBODIMENTS

First embodiment

Figure 1:
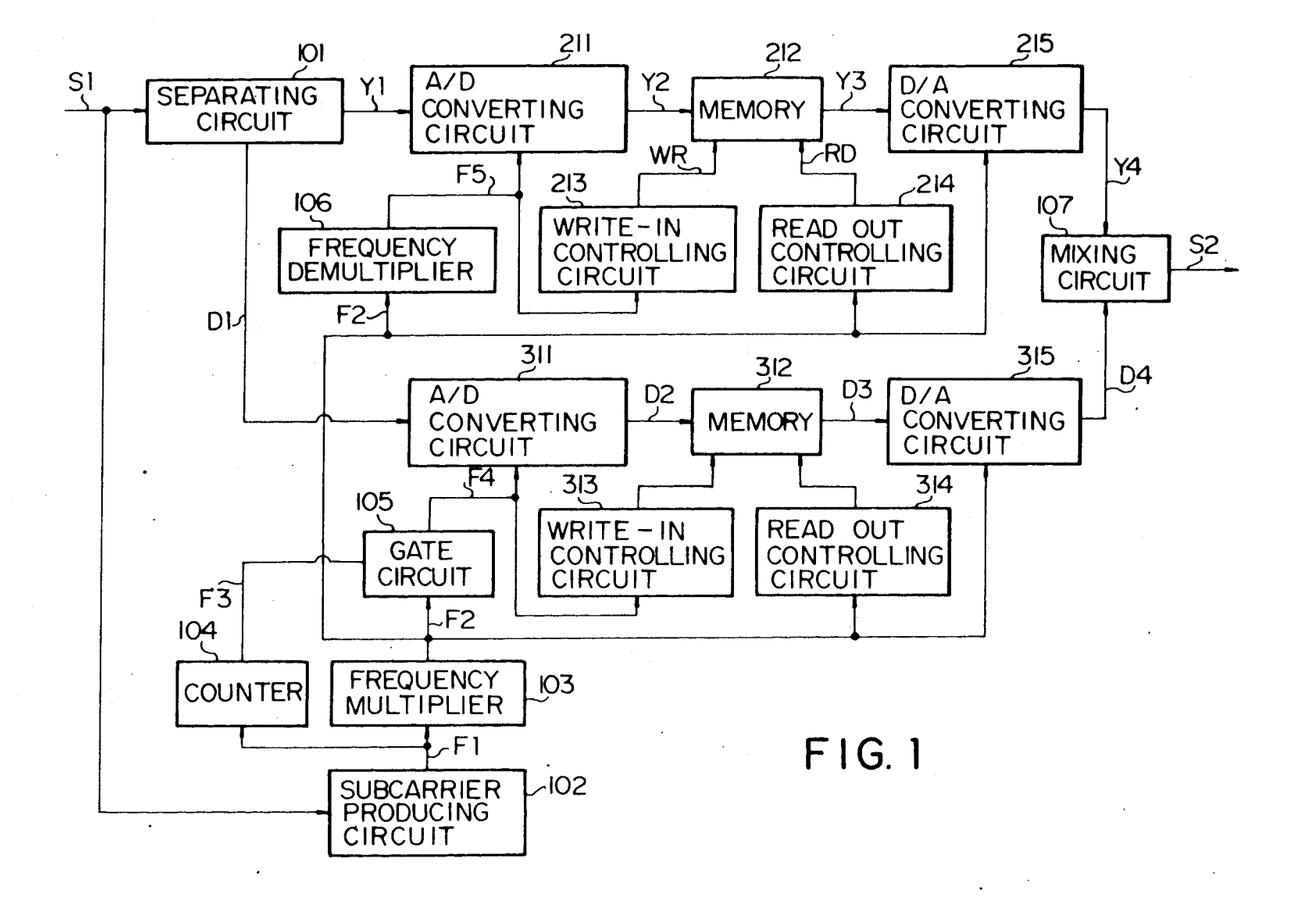
FIG. 1 is a block diagram showing the arrangement of an image squeezing circuit according to the present invention.
Figure 2:
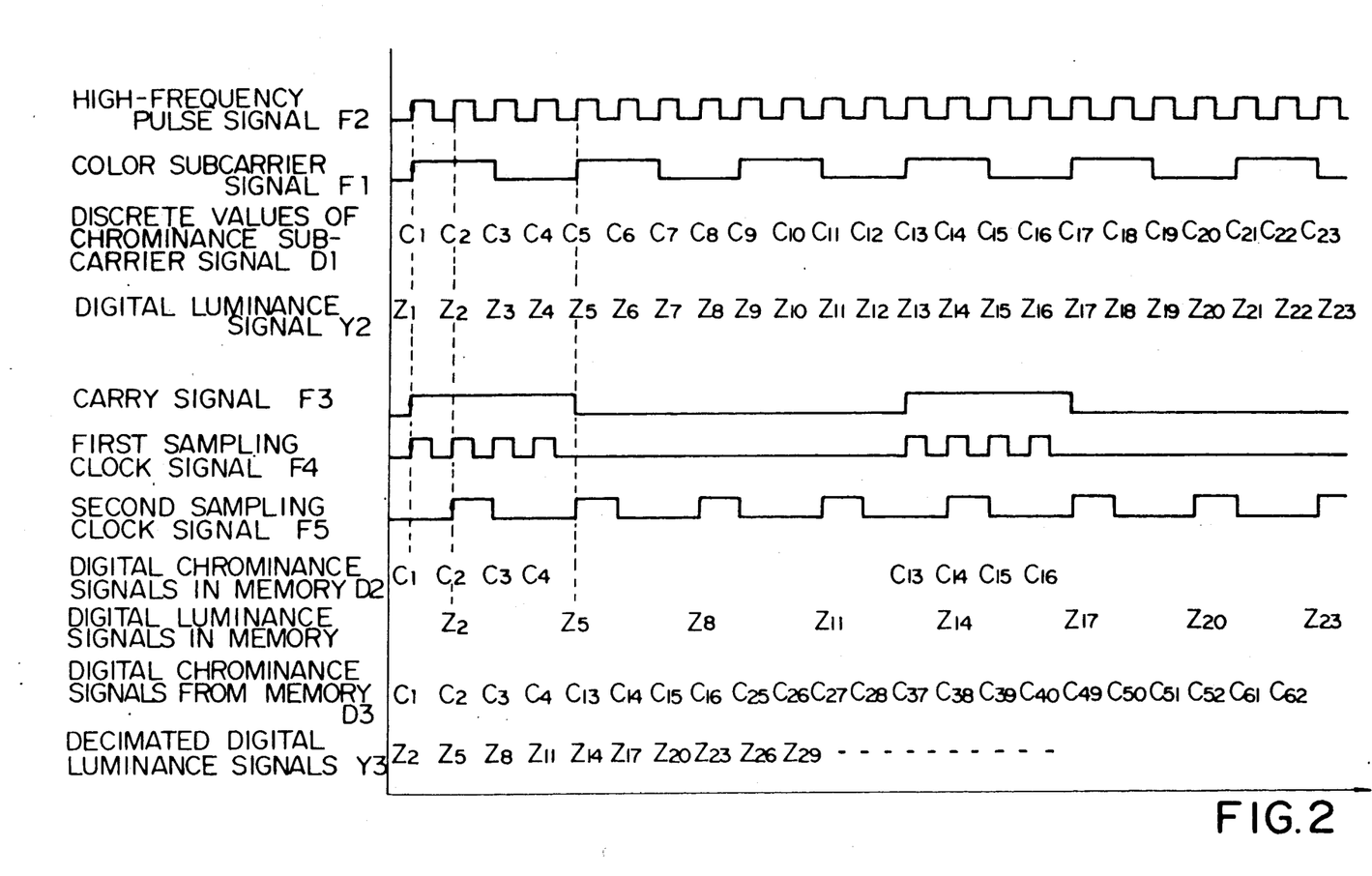
FIG. 2 is a diagram showing the timing chart of the image squeezing circuit shown in FIG. 1.

Referring first to FIG. 1 and, concurrently, to FIG. 2 of the drawings, an image squeezing circuit according to the present invention is supplied with an input image carrying signal S1. In this instance, m and n are assumed to be three and four, respectively. The input image carrying signal S1 is transferred in parallel to a separating circuit 101 and a subcarrier producing circuit 102, and the separating circuit is operative to separate a luminance signal Y1 from a chrominance subcarrier signal D1. The subcarrier producing circuit 102 is provided for producing a color subcarrier signal F1 in synchronization with the color burst of the input image carrying signal S1, and the color subcarrier signal F1 is supplied in parallel to a frequency multiplier 103 and a mod-m counter circuit 104, and the frequency multiplier 103 produces a high frequency pulse signal F2 which is four times larger in frequency than the color subcarrier signal F1. In this instance, the mod-m counter circuit 104 is of the mod-3 counter, and is operative to produce a carry signal F3 the frequency of which is a third of that of the color subcarrier signal F1.

The high frequency pulse signal F2 is supplied to a gate circuit 105, and the gate circuit 105 is transparent to the high frequency pulse signal F2 in the presence of the carry signal F3 of a high voltage level. The high frequency pulse signal F2 passing through the gate circuit 105 serves as a first sampling clock signal F4. The high frequency pulse signal F2 is further supplied to a frequency demultiplier 106, and the frequency demultiplier 106 produces a second sampling clock signal F5 the frequency of which is a third of that of the high frequency pulse signal F2.

The luminance signal Y1 separated by the separating circuit 101 is supplied to an analog-to-digital converting circuit 211, and the analog-to-digital converting circuit 211 is responsive to the second sampling clock signal F5 for sampling the luminance signal Y1. Then, the discrete values of the luminance signal Y1 are converted into digital luminance signals Y2. Thus, the digital luminance signal Y2 is representative of the discrete values of the analog luminance signal Y1, and the discrete values are respectively indicated by Z1, Z2, ... and Z23 in FIG. 2. The digital luminance signals Y2 are transferred from the analog-to-digital converting circuit 211 to a memory 212, and the second sampling clock signal F5 is supplied to a write-in controlling circuit 213 for producing a write-in timing signal WR1. The memory 212 memorizes the digital luminance signal Y2 in the presence of the write-in timing signal WR1, so that every third digital luminance signal Y2 is periodically memorized in the memory 212 and the other digital luminance signals are discarded. The digital luminance signals Y2 are thus decimated or thinned out, and are constituted by the digital luminance signals representative of the values Z2, Z5, ... and Z23 in this instance. The digital luminance signals thus memorized are hereinunder referred to as decimated digital luminance signals Y3. The memory 212 is further associated with a read out controlling circuit 214, and the read out controlling circuit 214 is responsive to the high frequency pulse signal F2 for producing a read out timing signal RD1. The decimated digital luminance signals Y3 memorized in the memory 212 are successively read out from the memory 212 in the presence of the read out controlling signal RD1 as shown in FIG. 2, and the decimated digital luminance signal Y3 is supplied to a digital-to-analog converting circuit 215. The digital-to-analog converting circuit 215 changes the decimated digital luminance signal Y3 into an equivalent decimated analog luminance signal Y4 in response to the high frequency pulse signal F2, and the decimated analog luminance signal Y4 is supplied to a mixing circuit 107.

On the other hand, the chrominance subcarrier signal D1 separated by the separating circuit 101 is supplied to an analog-to-digital converting circuit 311, and the chrominance subcarrier signal D1 is sampled with the first sampling clock signal F4. Since the gate circuit 105 is gated by the carry signal F3, four component pulses of the high frequency pulse signals are periodically transferred so that the first sampling clock signal F4 is constituted by plural groups of pulses each consisting of four pulses. Assuming now C1, C2, ... and C23 are representative of the discrete values of the analog chrominance subcarrier signal D1 sampled with the high frequency pulse signal F2, digital chrominance signals D2 are constituted by a plurality of digital signal groups at a certain interval each consisting of the four digital chrominance signals representative of, for example, C1, C2, C3 and C4. Thus, the analog chrominance subcarrier signal D1 is decimated upon the sampling operation by the analog-to-digital converting circuit 311, and the digital chrominance signals D2 are supplied to a memory 312. The memory 312 is associated with a write-in controlling circuit 313 and a read out controlling circuit 314, and the write-in controlling circuit 313 and the read out controlling circuit 314 are respectively responsive to the first sampling signal F4 and the high frequency pulse signal F2 for producing a write-in timing signal WR2 and a read out timing signal RD2, respectively. The digital chrominance signals D2 are memorized in the presence of the write-in controlling signal WR2, and the decimated digital chrominance signals are successively read out from the memory 312 in response to the read out controlling signal RD2. The decimated digital chrominance signals D3 thus successively read out are supplied to a digital-to-analog converting circuit 315. and are converted into a decimated analog chrominance subcarrier signal D4 which is transferred to the mixing circuit 107.

The mixing circuit 107 mixes the decimated analog luminance signal Y4 with the decimated analog chrominance subcarrier signal D4, and, accordingly, produces an output image carrying signal S2.

The circuit behavior of the image squeezing circuit shown in FIG. 1 is summarized as follows. If the input analog image carrying signal S1 is supplied to the separating circuit 101, the luminance signal Y1 is separated from the chrominance subcarrier signal D1. On the one hand, the analog luminance signal Y1 is successively converted into a series of the digital luminance signals Y2, while on the other hand, the analog chrominance subcarrier signal D1 is periodically converted into the digital chrominance signals. The series of the digital luminance signals Y2 are periodically written into the memory 212, while all of the digital chrominance signals D2 are written into the memory 312. In other words, the digital luminance signals Y2 are decimated upon memorization, while the analog chrominance subcarrier signal D1 is decimated upon sampling operation. Both the digital luminance signals Y2 and the digital chrominance signals D2 are read out from the respective memories 212 and 312 in synchronization with each other, and are mixed with each other for producing the output image carrying signal S2. In this instance, the digital luminance signals are decimated to a third, and the digital chrominance signal is also decimated to a third. Thus, the output image carrying signal S2 reproduces a small image squeezed to a third of the original image which is assumed to be reproduced with the input image carrying signal S1.

In the image squeezing circuit shown in FIG. 1, the frequency multiplier circuit 103 produces the high frequency pulse signal F2 which is four times as great in frequency as the color subcarrier signal F1, however, the high frequency pulse signal F2 may be a predetermined multiple n as great in frequency as the color subcarrier signal, and the predetermined multiple may be equal to or greater than three. Moreover, the counter is of the mod-3 counter, however, m may be equal to or greater than 2 depending upon the reduction ratio the image.

Now let us discuss the deviation between the decimated digital luminance signal Y3 and the decimated digital chrominance signal D3. As will be seen from the lowest two lines of FIG. 2, the suffixes of the decimated luminance signal Y3 are not identical with the suffixes of the corresponding decimated digital chrominance signal D3, and the mixing circuit 107 produces the output image carrying signal S2 on the basis of each combination of those decimated digital signals. However, in an actual application, the R-Y signal is in 0.5 MHz range, and the B-Y signal is also in 0.5 MHz range. On the other hand, the luminance signal has more than 3 MHz range. In this situation, the above-mentioned deviation is merely fallen into a variation of color of the order of a sixth in terms of the original color. Then, the deviation between the decimated digital luminance signal and the decimated digital chrominance signal is acceptable in so far as the reduction ratio ranges between about a half and about a quarter.

In the image squeezing circuit shown in FIG. 1, the separating circuit 101 and the subcarrier producing circuit 102 respectively form a separating section and a color subcarrier producing section, and the counter circuit 104, the frequency multiplier 103, the gate circuit 105 and the frequency demultiplier 106 as a whole constitute a timing signal producing section. The analog-to-digital converting circuit 311, the memory 312, the write-in controlling circuit 313, the read out controlling circuit 314 form in combination a first decimating section, and the analog-to-digital converting circuit 211, the memory 212, the write-in controlling circuit 213 and the read out controlling circuit 214 as a whole constitute a second decimating section. Finally, the digital-to-analog-converting circuits 215 and 315 and the mixing circuit 107 form in combination an output section.

Second embodiment

Figure 3:
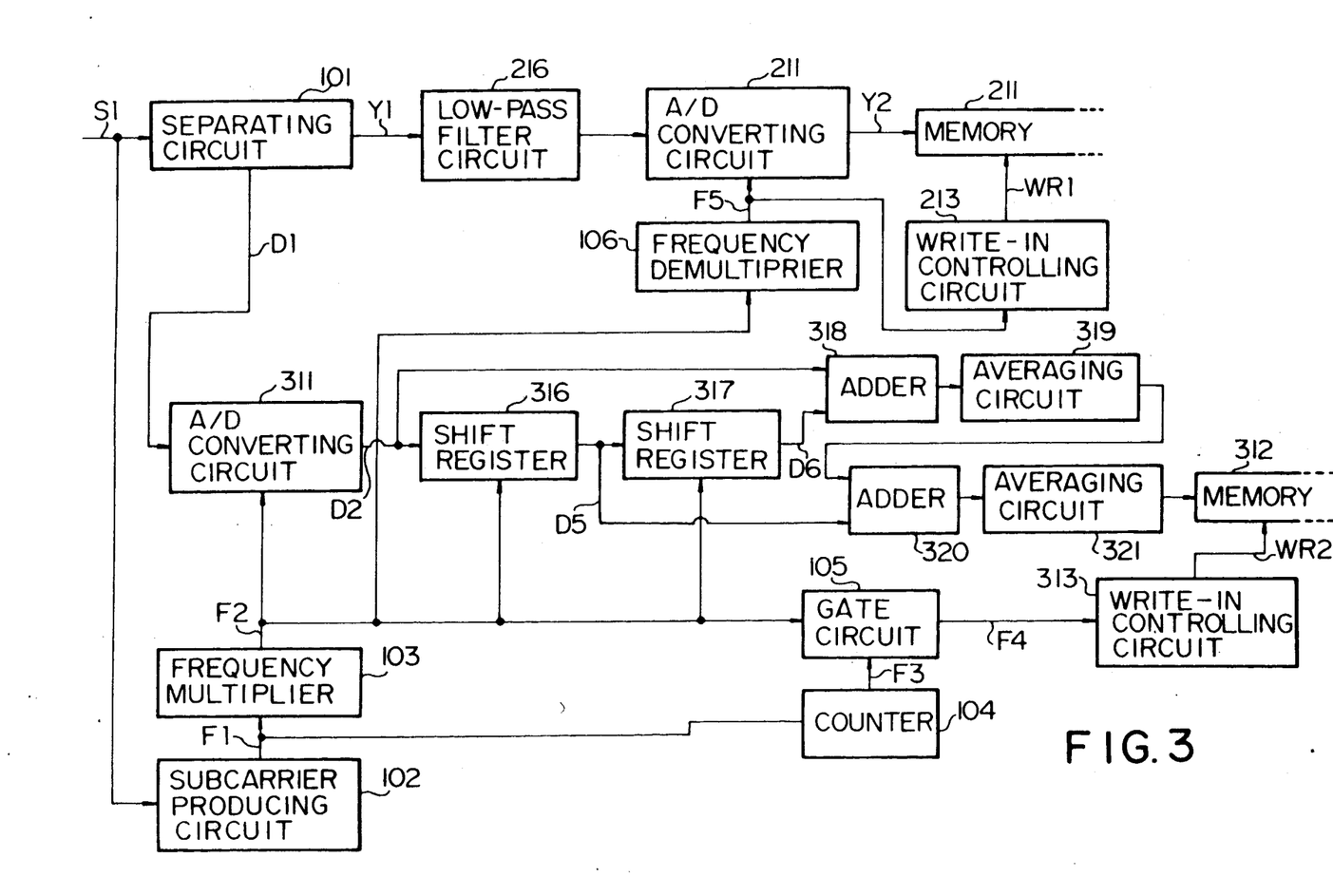
FIG. 3 is a block diagram showing the arrangement of a part of another image squeezing circuit according to the present invention.

Turning to FIG. 3 of the drawings, an essential part of another image squeezing circuit embodying the present invention is illustrated. The image squeezing circuit shown in FIG. 3 is similar in arrangement to the image squeezing circuit shown in FIG. 1 with the exception of means for producing a high quality squeezed image. For this reason, component circuits are designated by the same reference numerals denoting the corresponding component circuits of the image squeezing circuit shown in FIG. 1. Moreover, the memories 212 and 312 are also associated with read out controlling circuits, digital-to-analog converting circuits and a mixing circuit in a similar manner to those shown in FIG. 1, however, these circuits are omitted from FIG. 3 for the sake of simplicity.

A low pass filter circuit 216 is coupled between the separating circuit 101 and the analog-to-digital converting circuit 211, so that noise components produced upon the separation are eliminated from the luminance signal Y1.

On the other hand, between the analog-to-digital converting circuit 311 and the memory 312 are coupled a series combination of a first adder 318, a first averaging circuit 319, a second adder 320 and a second averaging circuit 321 which is associated with a series combination of first and second shift registers 316 and 317. The first and second shift registers 316 and 317 are responsive to the high frequency pulse signal F2. The first shift register 316 introduces a delay in the transmission of the digital chrominance signal D2 by a time period tantamount to four pulses of the high frequency pulse signal F2, thereby producing a first delayed digital chrominance signal D5. The second shift register 317 further introduces a delay in the transmission of the first delayed digital chrominance signal D5 by a time period equivalent to the four pulses of the high frequency pulse signal F2, and produces a second delayed digital chrominance signal D6. Since the first adder 318 is coupled at the input nodes thereof to the analog-to-digital converting circuit 311 and the second shift register 317, the digital chrominance signal D2 is added to the second delayed digital chrominance signal D6. The first averaging circuit 319 is supplied with the sum from the first adder 318, and is operative to divide by two for taking an average. The second adder is coupled at the input nodes thereof to the first averaging circuit 319 and the first shift register 316, and the first delayed digital chrominance signal D5 is added to the average fed from the first averaging circuit 319. The sum fed from the second adder 320 is divided by two for taking an average. Thus, the three digital chrominance signals are averaged through the twice adding and dividing operations, and, for this reason, the reproduced image is natural in color without any rapid color change. Moreover, since each of the shift registers 316 and 317 introduces the time delay equivalent to four pulses, the three digital chrominance signals are identical with one another in phase in the signal groups each consisting of the fours digital chrominance signals successively sampled. For example, the digital chrominance signal labeled with C1 is added to the digital chrominance signal labeled with C9 at the first adder 318, and the sum is added to the digital chrominance signal labeled with C5 at the second adder 320. For this reason, no turbulence takes place in the phase information.

The digital chrominance signal D2 thus averaged is memorized in the memory 312 in response to the write-in controlling signal WR2 fed from the write-in controlling circuit 313, and the digital luminance signal Y2 is memorized into the memory 211 in response to the write-in controlling signal WR1 fed from the write-in controlling circuit 213. However, these write-in operations as well as the read out operations are similar to those of the image squeezing circuit shown in FIG. 1, and, for this reason, no further description is incorporated.

In the image squeezing circuit shown in FIG. 3, the shift registers 316 and 317, the adders 318 and 320, and the averaging circuits 319 and 321 are incorporated in the first decimating section.

Third embodiment

Figure 4:
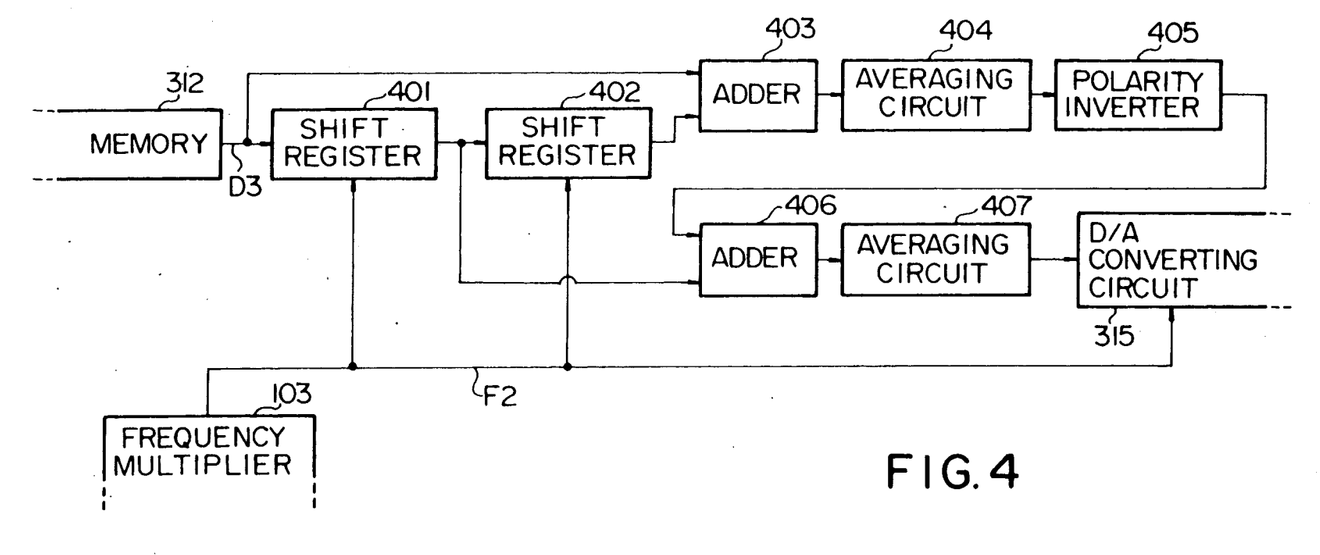
FIG. 4 is a block diagram showing the arrangement of a part of still another image squeezing circuit according to the present invention.

Turning to FIG. 4 of the drawings, a part of still another image squeezing circuit embodying the present invention is illustrated, and this image squeezing circuit aims at production of a high quality image similar to that shown in FIG. 3. However, the other parts are similar in arrangement to those of the image squeezing circuit shown in FIG. 1, and, for this reason, the component circuits are designated by the same reference numerals without any detailed description.

For producing a high quality image, between the memory 312 and the digital-to-analog converting circuit 315 is coupled a series combination of a first adder 403, a first averaging circuit 404, a polarity inverting circuit 405, a second adder 406 and a second averaging circuit 407 which is associated with a series combination of a first and second shift registers 401 and 402. Both of the first and second shift registers are supplied with the high frequency pulse signal F2 for shifting operations, and each of the first and second shift registers 401 and 402 introduces a delay into the transmission of the decimated digital chrominance signal D3 by a time period equivalent to two pulses of the high frequency pulse signals.

The circuit behavior is similar to that shown in FIG. 3 with the exception of the amount of the delay introduced by each shift register 401 or 402. When each of the shift registers 401 and 402 introduces the delay equivalent to two pulses, the second decimated digital chrominance signal added by the second adder 405 is different in phase from the first and third decimated digital chrominance signals by 180 degrees, and, for this reason, the polarity inverting circuit 405 is provided between the averaging circuit 404 and the second adder 406 for matching the phases.

Since the time delay introduced by each shift register 401 or 402 is shorter than the time delay introduced by each shift register 316 or 317, the bandwidth of the chrominance subcarrier signal responsible to the image squeezing circuit shown in FIG. 4 is wider than the bandwidth of the chrominance subcarrier signal responsible to the image squeezing circuit shown in FIG. 3. Comparing the chrominance signal written into the memory with the chrominance signal read out from the memory, the bandwidth at the reading out side is widened depending upon the reduction ratio of image. For example, if the reduction ratio is a half, the bandwidth is widened twice. Then, it is important not to excessively restrict the bandwidth.

In the image squeezing circuit shown in FIG. 4, the shift registers 401 and 402, the adders 403 and 406, the averaging circuits 404 and 407 and the polarity inverting circuit 405 are incorporated in the first decimating section.

Although particular embodiments of the present invention have been shown and described, it will be obvious to those skilled in the art that various changes and modifications may be made without departing from the spirit and scope of the present invention.

What is claimed is:

1. An image squeezing circuit for producing an output color image carrying signal used to reproduce an image 1/m the size of an ordinary-sized image, m being an integer equal to or greater than 2, the output color image carrying signal being produced from an input color image carrying signal used to reproduce the ordinary-sized image, which image squeezing circuit comprises:
   (a) means responsive to the input color image carrying signal for producing a color subcarrier signal;
   (b) first sampling means for sampling a chrominance component of the input color image carrying signal every m cycles of the color subcarrier signal and at a rate which is n times the frequency of the color subcarrier signal to produce a sampled chrominance signal, n being an integer equal to or greater than 3;
   (c) second sampling means for sampling a luminance component of the input color image carrying signal at a rate which is n/m times the frequency of the color subcarrier signal to produce a sampled luminance signal; and
   (d) output signal means responsive to the sampled chrominance signal and the sampled luminance signal for producing a reduced color image carrying signal which is 1/m the size of the input color image carrying signal.

2. An image squeezing circuit as set forth in claim 1, further including means for producing first and second sampling signals and in which the first and second sampling means are responsive respectively to the first and second sampling signals, the first sampling signal having a frequency n times the frequency of the color subcarrier signal and appearing every m cycles of the color subcarrier and the second sampling signal having a frequency n/m times the frequency of the color subcarrier signal.

3. An image squeezing circuit as set forth in claim 1, in which said image squeezing circuit further comprises separating means supplied with said input color carrying signal and producing a luminance signal and a chrominance subcarrier signal, and in which said first sampling means comprises a first analog-to-digital converting circuit for producing a decimated digital chrominance signal on the basis of said chrominance subcarrier signal, averaging means for producing an average digital chrominance signal, a first memory coupled to said averaging means, and a first write-in controlling circuit responsive to said first sampling signal and providing a write-in control signal to said first memory, wherein said second sampling means comprise an analog-to-digital converting circuit responsive to said second sampling signal and producing a digital luminance signal on the basis of said luminance signal, a second memory coupled to said analog-to-digital converting circuit, and a second write-in controlling circuit responsive to said second sampling signal and providing a write-in control signal to said second memory.

4. An image squeezing circuit as set forth in claim 1, in which said output signal producing means comprise an averaging means for producing an average chrominance signal, and a digital-to-analog converting circuit coupled to said averaging means.

5. An image squeezing circuit for producing an output color image carrying signal used to reproduce an image 1/m the size of an ordinary-sized image, m being an integer equal to or greater than 2, the output color image carrying signal being produced from an input image carrying signal used to reproduce the ordinary-sized image, which image squeezing circuit comprises:

(a) a separating section supplied with said input color image carrying signal and operative to produce an analog luminance signal and an analog chrominance subcarrier signal;

(b) a color subcarrier producing section supplied with said input color image carrying signal and operative to produce a color subcarrier signa lwhich is a periodic signal;

(c) a timing signal producing section operative to produce a first sampling clock signal, n time larger in frequency than said color subcarrier signal and appearing in every m intervals of said color subcarrier signal, where n is an integer equal to or greater than 3, a second sampling signal n/m times larger in frequency than the color subcarrier signal, and a high frequency periodeic signal n times larger in frequency than the color subcarrier signal, said timing signal producing section comprising a mod-m counter circuit coupled at the input node thereof to said color sub-carrier producing section and operative to produce a carry signal, a frequency multiplier coupled at the input node thereof to the color subcarrier producing section and operative to produce said high frequency periodic signal, a gate circuit responsive to the carry signal and producing the first sampling signal, and a frequency demultiplier supplied with the high frequency periodic signal and producing said second sampling signal;

(d) a first subsampler section supplied with said analog chrominance subcarrier signal and responsive to said first sampling signal for producing a decimated digital chrominance signal, said decimated digital chrominance signal being delivered therefrom in response to said high frequency periodic signal, said first subsampler section comprising an analog-to-digital converting circuit supplied with said analog chrominance subcarrier signal and responsive to said first sampling signal for producing a raw decimated digital chrominance signal, a memory for storing said raw decimated digital chrominance signal, a write-in controlling circuit responsive to the first sampling signal and allowing the memory to store the raw decimated digital chrominance signal, and a read out controlling circuit responsive to said high frequency periodic signal and allowing the memory to deliver said decimated digital chrominance signal;

(e) a second subsampler section supplied with said analog luminance signal and responsive to said second sampling signal for producing a decimated digital luminance signal, said decimated digital luminance signal being delivered therefrom in the presence of said high frequency periodic signal, said second subsampler section comprising an analog-to-digital converting circuit supplied with said analog luminance signal and responsive to said second sampling signal for producing a raw decimated digital luminance signal, a memroy for storing said raw decimated digital luminance signal, a write-in controlling circuit responsive to the second sampling signal and allowing the memory to store the raw decimated digital luminance signal, and a read out controlling circuit responsive to said high frequency periodic signal and allowing the memory to deliver said decimated digital luminance signal; and (f) an output section supplied with said decimated digital chrominance signal and said decimated digital luminance signal and operative to produce said output image carrying signal, said output section comprising digital-to-analog converting circuits responsive to said high frequency periodic signal and producing an analog decimated chrominance subcarrier signal and an analog decimated luminance signal, respectively, and a mixing circuit supplied with the analog decimated chrominance subcarrier signal and the analog decimated luminance signal and producing said output color image carrying signal.

6. An image squeezing circuit as set forth in claim 5, in which each of said first and second shift registers introduces a time delay equivalent to four periodic intervals of said high frequency periodic signal.

7. An image squeezing circuit for producing an output color image carrying signal used to reproduce an image 1/m the size of an ordinary sized image, m being an integer equal to or greater than 2, the output color image signal being produced from an input color image carrying signal used to reproduce the ordinary-sized image, which image squeezing circuit comprises:

(a) a separating section supplied with said input color image carrying signal and operative to produce an analog luminance signal and an analog chrominance subcarrier signal;

(b) a color subcarrier producing section supplied with said input color image carrying signal and operative to produce a color subcarrier signal which is a periodic signal;

(c) a timing signal producing section operative to produce a first sampling clock signal, n times larger in frequency than said color subcarrier signal and appearing in every m intervals of said color subcarrier signal, where n is an integer equal to or gerater than 2, a second sampling signal n/m times larger in frequency than the color subcarrier signal, and a high frequency periodic signal n times larger in frequency than the color subcarrier signal, said timing signal producing section comprising a mod-m counter circuit coupled at the input node thereof to said color subcarrier producing section and operative to produce a carry signal, a frequency multiplier coupled at the input node thereof to the color subcarrier producing section and operative to produce said high frequency periodic signal, a gate circuit responsive to the carry signal and producing the first sampling signal, and a frequency demultiplier supplied with the high frequency peroidical signal and producing said second sampling signal;

(d) a first subsampler section supplied with said analog lujminance signal and responsive to said second sampling signal for producing a decimated digital luminance signal, said decimated digital luminance signal being delivered theeform in response to said high frequency periodic signal, said first subsampler section comprising an analog-to-digital converting circuit supplied with said analog luminance signal and responsive to said second sampling signal for producing a raw decimated digital luminance signal, a memory for storing said raw decimated digital luminance signal, a write-in controlling circuit responsive to the second sampling signal and allowing the memory to store the raw decimated digital luminance signal, a read out controlling circuit responsive to said high frequency periodic signal and allowing the memory to deliver said decimated digital luminance signal;

(e) a second subsampler section supplied with said analog chrominance subcarrier signal and responsive to said first sampling signal for producing a decimated digital chrominance signal, said decimated digital chrominance signal being delivered therefrom in the presence of said high frequency periodic signal, said second subsampler section comprising an analog-to-digital converting circuit supplied with said analog chrominance subcarrier signal and responsive to said first sampling signal for producing a raw decimated digital chrominance signal, a memory for storing said raw decimated digital chrominance signal, a write-in controlling circuit responsive to the first sampling signal and allowing the memory to store the raw decimated digital chrominance signal, a read out controlling circuit responsive to said high frequency periodic signal and allowing the memory to deliver said decimated digital chrominance signal, a series combination of first and second shift registers coupled at the input side thereof to said memory for introducing time delays into transmission of said decimated digital chrominance signal, a first adder coupled at the first input node thereof to the memory and at the second input node theeof to the second shift register, a first averaging circuit coupled to the first adder and operative to divide the sum fed from the first adder by two, a polarity inverting circuit operative to change the decimated digital chrominance signal by about 180 degrees, a second adder coupled at the first input node thereof to the first shift register and at a second input node thereof to the polarity inverting circuit, and a second averaging circuit coupled at the input node thereof to the second adder for dividing the sum from the second adder by two and having an output node; and (f) an output section supplied with said decimated digital chrominance signal from said output noe of said second averaging circuit and supplied with said decimated digital luminance signal from said first subsampler section and operative to produce said output image carrying signal.

* * * * *